(12) United States Patent
Nallur et al.

(10) Patent No.: US 8,081,568 B2
(45) Date of Patent: Dec. 20, 2011

(54) ROLE DETERMINATION FOR NETWORK DEVICES

(75) Inventors: Padmanabha Nallur, Fremont, CA (US); Wilson Kok, San Jose, CA (US); Rajesh Bhandari, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 12/035,502

(22) Filed: Feb. 22, 2008

(65) Prior Publication Data

US 2009/0213733 A1  Aug. 27, 2009

(51) Int. Cl.
*G01R 31/08* (2006.01)
(52) U.S. Cl. .......................... 370/230; 370/330
(58) Field of Classification Search .................. 370/235, 370/348, 329, 230, 330; 713/186, 168; 455/411
See application file for complete search history.

(56) References Cited

U.S. PATENT DOCUMENTS

| | | | | |
|---|---|---|---|---|
| 6,225,888 B1* | 5/2001 | Juopperi | .................... | 340/5.8 |
| 7,400,596 B1* | 7/2008 | Robertson et al. | ............ | 370/312 |
| 2006/0036856 A1* | 2/2006 | Kok | .............................. | 713/168 |
| 2006/0255129 A1* | 11/2006 | Griffiths | ........................ | 235/382 |
| 2008/0065888 A1* | 3/2008 | Zheng et al. | ................... | 713/171 |
| 2008/0226071 A1* | 9/2008 | Braskich et al. | ............. | 380/258 |
| 2008/0289036 A1* | 11/2008 | Kandasamy et al. | ........... | 726/21 |

OTHER PUBLICATIONS

Peter J. Welcher, "Examining 802.1x and EAP," Chesapeake Netcraftsmen, <http://www.netcraftsmen.net/welcher/papers/dot1x.html>.
"IEEE 802.1X," Wikipedia, <http://en.wikipedia.org/wiki/802.1x>.

* cited by examiner

*Primary Examiner* — Ricky Ngo
*Assistant Examiner* — David Oveissi
(74) *Attorney, Agent, or Firm* — Patterson & Sheridan, LLP (57) ABSTRACT

Techniques for selecting authentication roles when establishing a link between devices in a secure network are provided. By assigning role levels to devices, devices may be more likely to assume a preferred role when establishing a link. For example, during a negotiation process, each device may establish a timer value based on their role level. Each device may initiate a timer with the timer value and, the device whose timer value expires first may assume a role as authenticator.

22 Claims, 6 Drawing Sheets

| ROLE LEVEL | T1 ( ms ) |
|---|---|
| SUPP ONLY | N / A OR ∞ |
| AUTH 1 | 40 |
| AUTH 2 | 30 |
| AUTH 3 | 10 |
| AUTH ONLY | 0 |

FIG. 5

ROLE DETERMINATION FOR NETWORK DEVICES

BACKGROUND OF THE INVENTION

1. Field of the Invention

Embodiments of the present invention generally relate to networking and, more particularly, to controlling the flow of network traffic.

2. Description of the Related Art

In secure networks, such as wireless networks, devices often join and leave the network, for example, as mobile users enter and leave a site. When a link between two devices needs to be established (or "brought up), the device that is trying to get admitted into the network typically takes up a role of a "Supplicant" and the other device with which it is trying to connect takes up a role of an "Authenticator." The Authenticator has a secure connection to an Authentication Server (AS) and relays messages between supplicant and AS.

When a host device, such as a PC connects to a network, it is sometimes obvious that the host device should act as a supplicant. However, in some cases, multiple devices may be able to connect to the AS and the role of each device may not be immediately apparent. In such cases, both devices may be equally qualified to take on the role of either supplicant or authenticator.

What is needed is a technique to help establish a role in such cases.

BRIEF DESCRIPTION OF THE DRAWINGS

So that features of the present invention can be understood in detail, a particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide techniques for selecting authentication roles when establishing a link between devices in a secure network. By assigning role levels to devices, devices may be more likely to assume a preferred role when establishing a link. For example, during a negotiation process, each device may establish a timer value based on their role level. Each device may initiate a timer with the timer value and, the device whose timer value expires first may assume a role as authenticator. The networks are described as wireless, but may include wireless and wireline networks.

Thus, devices that are well suited to be an authenticator may be assigned role levels having lower associated timer values relative to other role levels, increasing the likelihood their timer will expire first and they will assume the role of authenticator. In this manner, techniques presented herein may allow an operator (e.g., a network administrator) flexibility in controlling what role any given device will assume when links are brought up between devices.

EXAMPLE NETWORK TOPOLOGY

Figure 1:
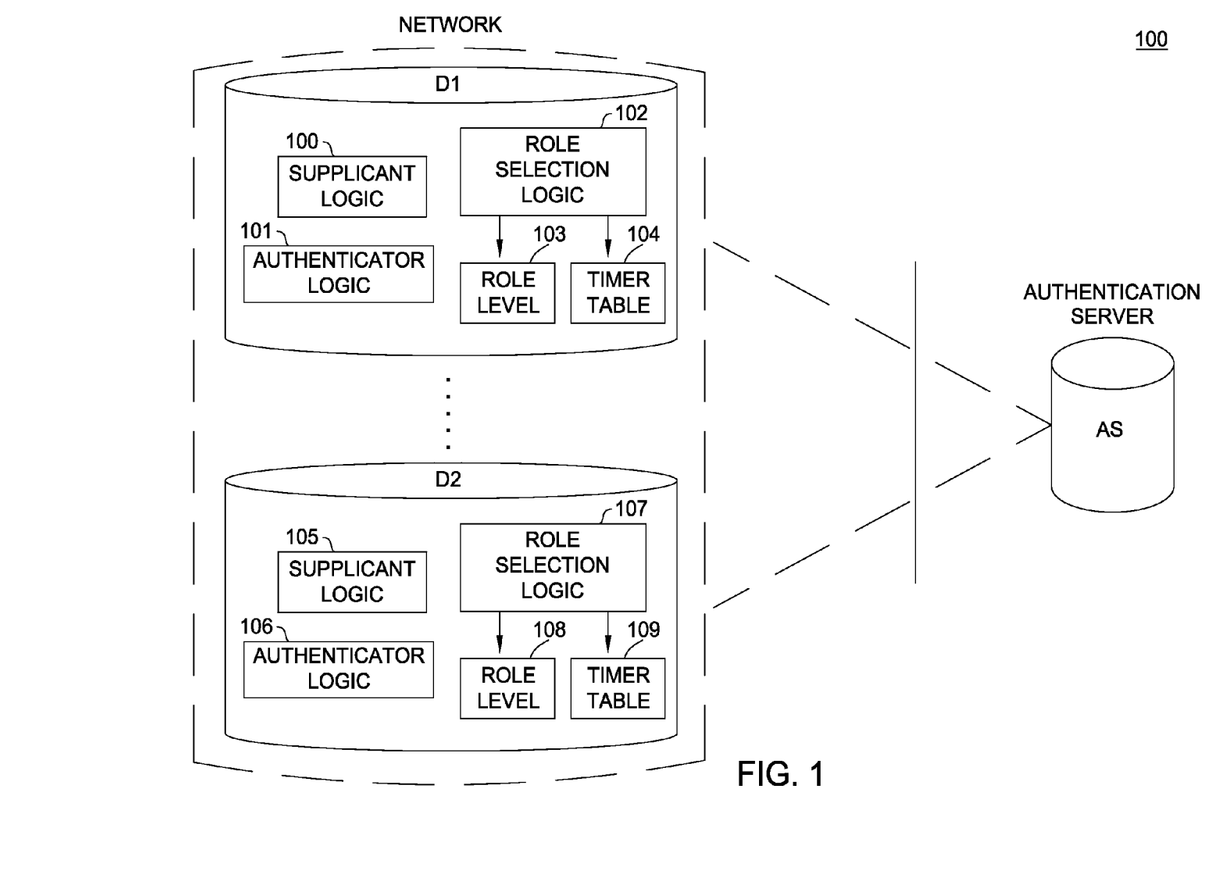
FIG. 1 is a view of the network according to an embodiment of the present invention.

FIG. 1 illustrates an example network 10 in which embodiments of the present invention may be utilized. The network 10 may be a wireless or wireline network, for example, with connectivity available between at least some of the devices. Security is a concern in wireless networks because of the ease with which a connection from a potential client to the wireless network. To prevent viruses, worms and prevent unauthorized use of networks, the network 10 may implement some type of network access control.

For some embodiments, the network may implement network access control pursuant to the IEEE 802.1X standard. The 802.1X standard outlines an authentication method in which a potential client, "the supplicant," is authorized. If the supplicant is not authorized then access to the network is denied.

Admission pursuant to 802.1X entails the exchange of messages between a supplicant and an authenticator. The supplicant sends a EAPOL_Start message to the authenticator. Then, the authenticator sends an EAP_Request sending the authenticator's identity to the supplicant and the supplicant sends an EAP_Response with an identity of the supplicant to the authenticator.

After the identities of the supplicant and authenticator are established, the authenticator issues a challenge to the suppliant, requesting a password. The challenge may be any one of OTP, MD5, or GTC protocols according to the EAP standard. Then, the supplicant sends a password to the authenticator and if the authenticator verifies it, the authenticator issues an EAP_Success message and the port is authorized. After the communication is complete between the supplicant and the authenticator, the supplicant transmits an EAPOL_Logoff message and the port is not longer authorized.

In the illustrated example, it may be assumed that both devices D1 and D2 can access the authentication server. Thus, when establishing a link between the devices (e.g., when D2 tries to gain admission to the network), either device is capable of performing authentication operations.

Thus, both devices D1 and D2 have both supplicant logic 100 and authenticator logic 101, allowing each device to act as a supplicant or authenticator, depending on a role selected by role selection logic 102. The role selection logic 102 may select a role based on an assigned role level 103 and a corresponding timer value, for example, stored in a lookup table.

Role Selection

Figure 2:
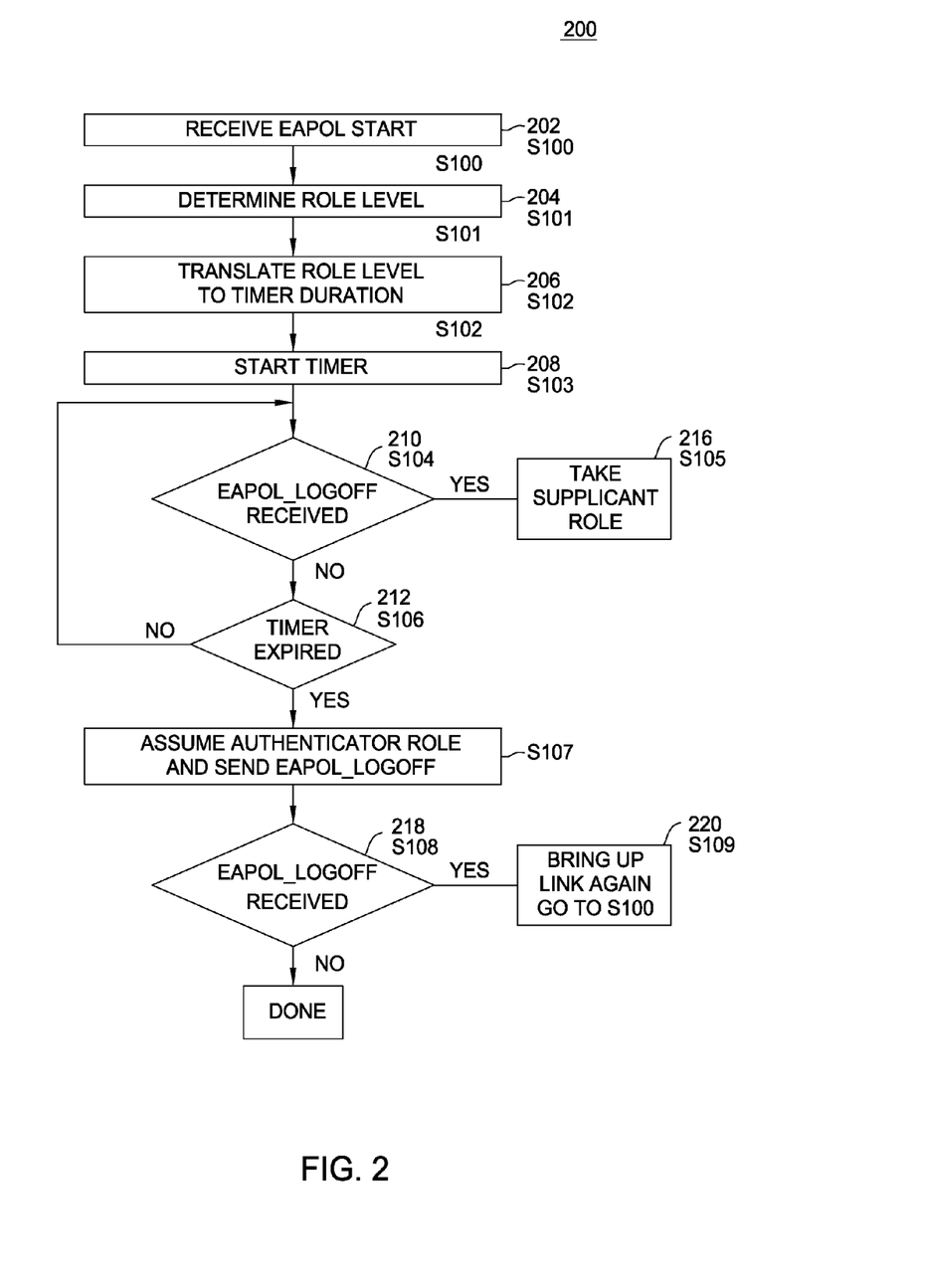
FIG. 2 is a flow chart of example operations for role determination according to an embodiment of the present invention.

FIG. 2 illustrates example operations 200 for selecting a role based on an assigned role level. The operations 200 may be performed, for example, independently by each device D1 and D2 when bringing up a link between the two. The operations may be described with reference to FIGS. 3A-3C which illustrate corresponding transactions between the devices.

Figure 3A:
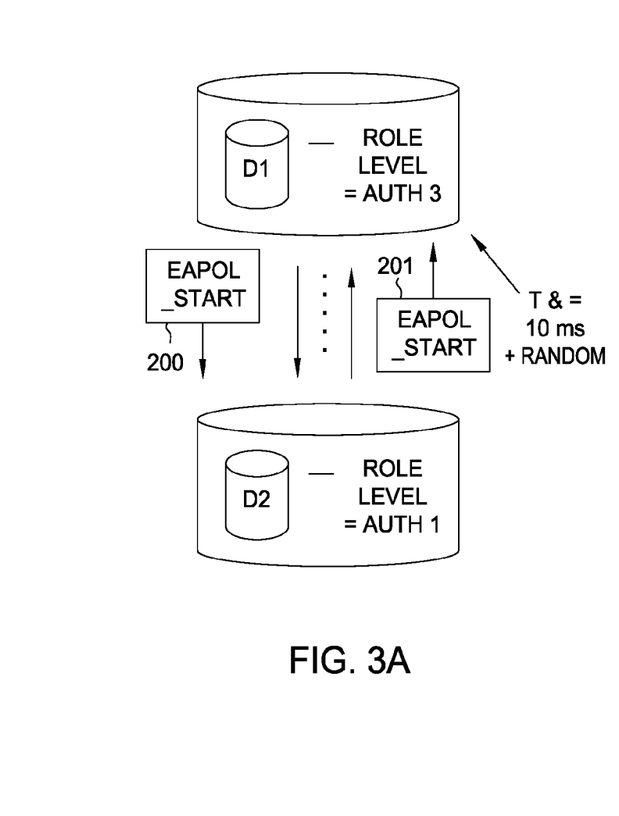
FIGS. 3A-3C illustrate transactions for role determination between devices having different role levels according to an embodiment of the present invention.

The operations 200 begin, at 202, by receiving an EAPOL Start message, from the other device. For example, as illustrated in FIG. 3A, each device may send an EAPOL Start message, effectively acting as a Supplicant initially.

At 204, a role level is determined and, at 206, the role level is translated into a timer value. At 208, a timer is initiated based, at least in part, on the timer value for the role level.

The role levels may be assigned, for example, by an operator during configuration of the device. In the illustrated example, D1 has been assigned a role level of "Authenticator 3" while the D2 has been assigned a role level of "Authenticator 1." As illustrated, the Authenticator 3 role level has a corresponding base timer value of 10 ms, while Authenticator 1 role level has a base timer value of 40 ms. As will be seen, the shorter timer value associated with the Authenticator 3 role level may result in a preference given to devices assigned this role level, relative to other devices assigned to role levels having longer timer values.

Figure 5:
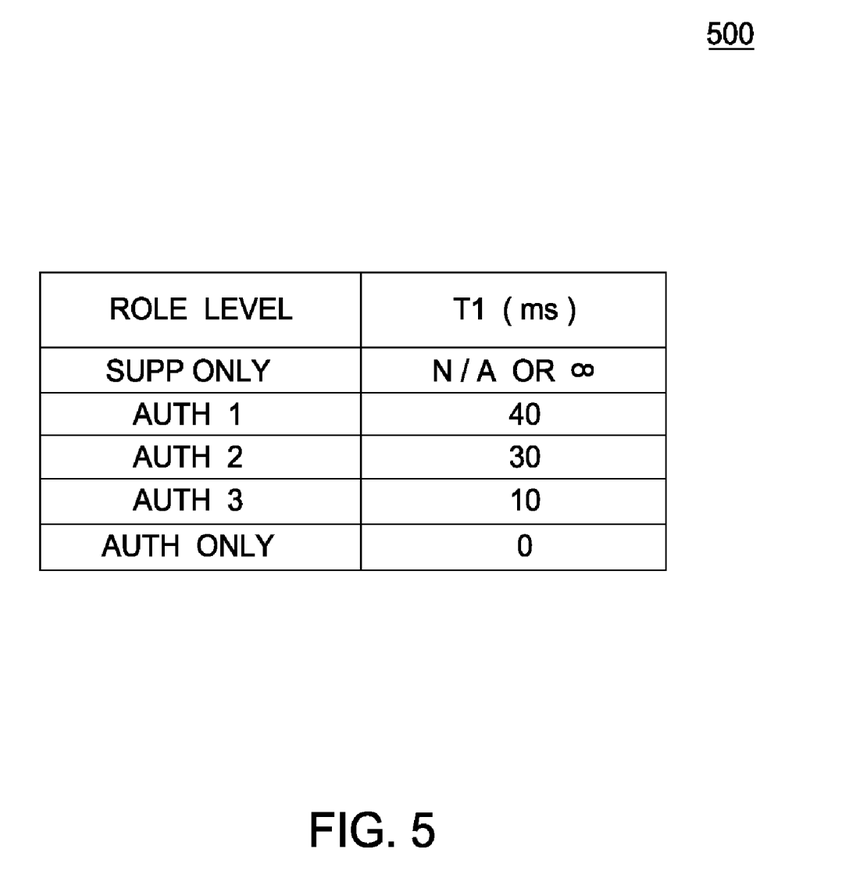
FIG. 5 depicts a base time assignment table to different role levels according to an exemplary embodiment of the present invention

For some embodiments, the timer value may be retrieved from a lookup table, such as the table shown in FIG. 5, having entries for role levels and their associated timer values. As will be described in greater detail below, for some embodiments a relatively short random timer value may be added to the "base" timer value associated with the role level in order to help prevent timers on each device from expiring at the same time or too close to each other.

If the timer expires, as determined at 212, before an EAPOL Logoff message is received, as determined at 210, the device assumes the authenticator role, at 214, and sends an EAPOL LOGOFF Message to notify the other device. On the other hand, if an EAPOL logoff message is received before the timer expires (indicating the other device has assumed the Authenticator role), the device assumes the supplicant role, at 216.

Figure 3B:
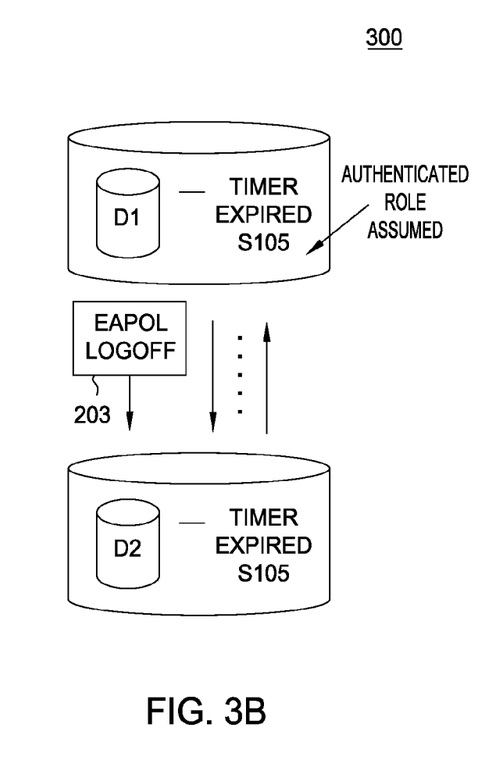
Figure 3C:
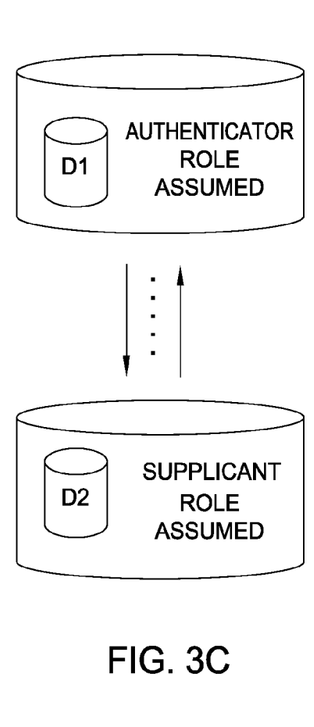

As illustrated in FIG. 3B, because D1 is assigned the Authenticator 3 role level having a shorter associated timer value than Authenticator 1 role level assigned to D2, the timer on D1 will expire first. Therefore, D1 will assume the Authenticator role and send an EAPOL logoff message to D2. In response, D2 will assume the Supplicant role, as illustrated in FIG. 3C.

In some cases, two devices may be assigned the same role level and, thus, may have the same base timer value (T1). In an effort to create a differential in the timer values (and prevent two devices from competing for the same role), at each device a random timer value may be added to the base timer value associated with the role level. The random timer value (RT) may be limited to prevent the total timer value (T1+RT) from exceeding the next higher base time. As an example, if base timer values are separated by 10 ms, the random timer value may be limited to between 0 and 1 ms and may be specified in smaller units (e.g., microsecond instead of milliseconds).

Even utilizing the random timer value, however, there may be instances when the timers expire within a time window that results in both devices assuming the Authenticator role (e.g., if the random timer values generated independently on the separate devices are close in value). Therefore, even after assuming the Authenticator role following the expiration of its timer, a device may receive an EAPOL Logoff message, indicating the other device has also assumed the Authenticator role. In response, the device may take action to again bring the link up (e.g., sending an EAPOL Start message to the other device).

Figure 4A:
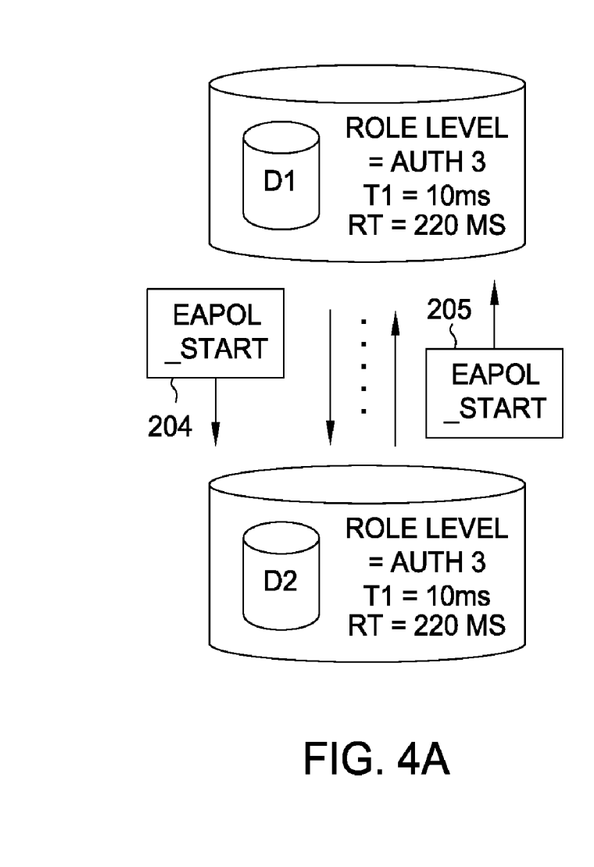
FIGS. 4A-4E illustrate transactions for role determination between devices having the same role level according to an embodiment of the present invention.

FIGS. 4A-4E illustrate how the random timer may be utilized to prevent (at least eventually) both devices from assuming the Authenticator role. As illustrated in FIG. 4A, both devices have the same role level (AUTH 3), while D1 has a random timer value of 200 us and D2 has a random timer value of 220 us.

Figure 4B:
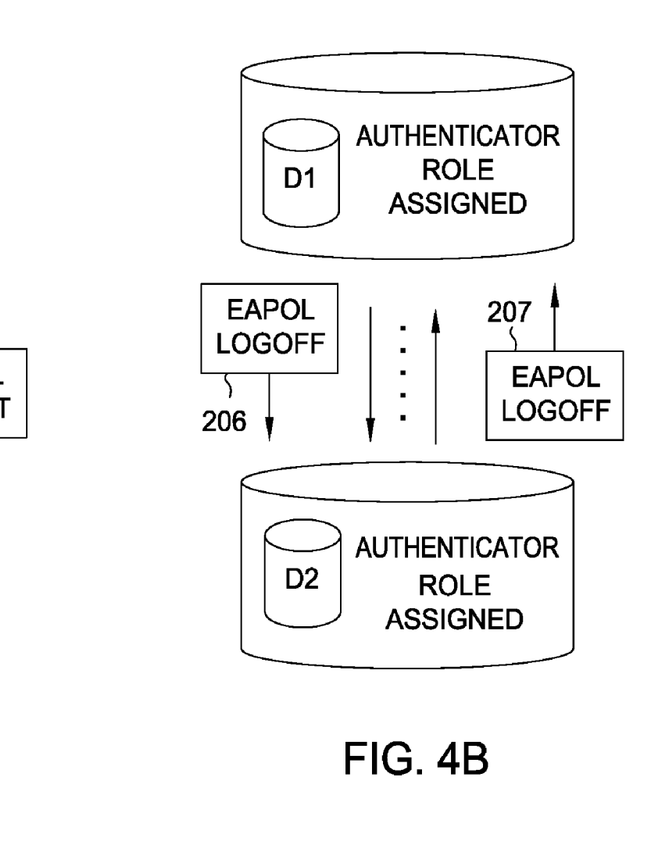

As illustrated in FIG. 4B, because the role levels are the same and the random timer values are close, the timers on each device may expire within a time window such that they both assume the Authenticator role and send out an EAPOL Logoff message to the other.

Figure 4C:
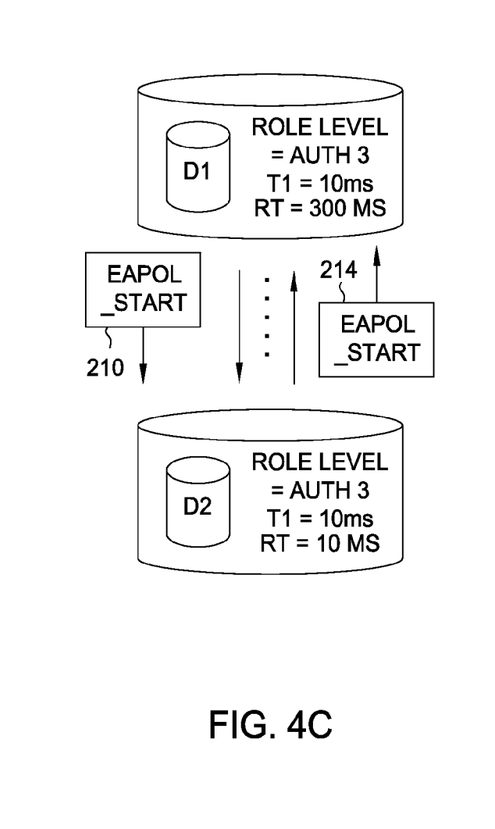
Figure 4D:
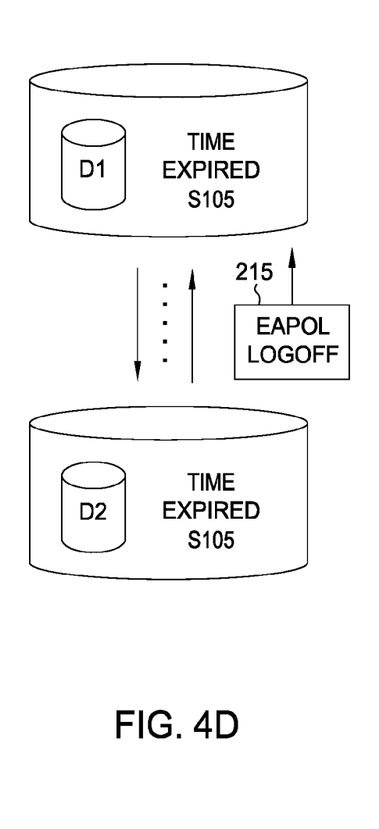
Figure 4E:
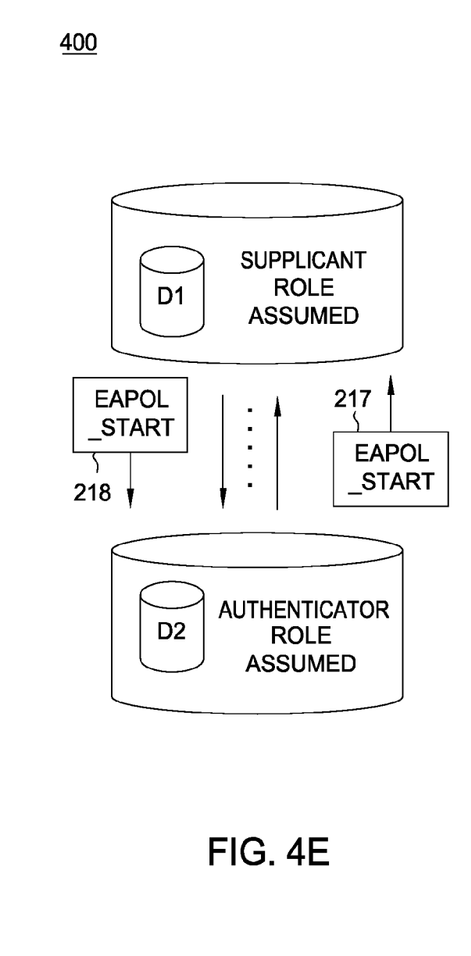

In response, the devices may again try and bring the link up, as illustrated in FIG. 4C. However, in this iteration, the random timer values are farther apart, with D1 having a random timer value of 300 us and D2 having a much shorter random timer value of 10 us. As a result, the timer for D2 may expire first and D2 may assume the Authenticator role and send an EAPOL Logoff message to D1, as illustrated in FIG. 4D. In response, D1 will assume the Supplicant role, as illustrated in FIG. 4E.

Role Level Assignment

By assigning different role levels to different devices, an operator may be able to control what devices assume desired roles. This may be advantageous, for example, when certain devices are better suited for certain roles. An operator may apply various criteria to determine what role level any particular device should be assigned to achieve a desired result.

The types of criteria that may be considered included, but are not limited to, L3 connectivity to AS, type and computing resources available to the device, operator preferences, and the role history. For example, devices with no access to the AS may be assigned a Supplicant Only role level. Similarly, a device with limited computing resources (e.g., CPU, memory size) may not be well suited to be an authenticator due to the relatively intensive processing involved.

For some embodiments, role levels may be assigned automatically, for example, utilizing a role selection algorithm implemented at the device level. Such an algorithm may consider the criteria described above. In addition, such an algorithm may consider operator preferences established via configuration (e.g., the operator may configure the device to prevent the device from assuming a specified type of role).

For some embodiments, the algorithm may consider a role history of the device, examining roles previously taken by the device and the corresponding result. For example, the algorithm may determine if the device was previously an Authenticator and, if so, whether the devices were able to successfully perform the authentication operations. If not, the algorithm may assign a Supplicant Only role level or a role level that gives a weaker preference to becoming an authenticator.

FIG. 5 illustrates example role levels and associated timer values. While only four role levels are shown in FIG. 5, any suitable number of role levels may be established to fit the needs of a particular network. As illustrated, example role levels include Supplicant Only, Authenticator Only, and various Authenticator levels with varying levels of preference given to becoming an authenticator.

A device assigned a Supplicant Only role level may refrain from ever becoming an Authenticator. Depending on the embodiment, the corresponding timer value could be ignored or the corresponding timer value could be set to a high value, effectively assuring that device will always assume the Supplicant role. In contrast, a device assigned an Authenticator Only role level may forego the operations described herein, assume the Authenticator role, and send an EAPOL message to notify the other device. Depending on the embodiment, the corresponding timer value could be ignored or set to a low value (e.g., zero), effectively assuring that device will always assume the Authenticator role.

Different Authenticator levels with different timer values may allow an operator to provide relatively fine grained control, preferring certain devices over others. Further, for some embodiments, an operator may also have control over the base timer values associated with each role level. Thus, an operator may set a wider variance between timer values for a role level that prefers a Supplicant role and timer values that prefer Authenticator roles.

For example, the operator may set timer values for Supplicant role levels to be much higher than timer values for Authenticator role levels in an effort to ensure devices assigned to Supplicant Role levels will not assume the role of Authenticator. However, if two devices both have been assigned Authenticator role levels, even if they are different, there may be little concern as to which device assumes the Authenticator role. Therefore, the operator may assign relatively close timer values to different Authenticator role levels.

While the foregoing is directed to embodiments of the present invention, other and further embodiments of the invention may be devised without departing from the basic scope thereof, and the scope thereof is determined by the claims that follow.

The invention claimed is:

1. A method comprising:
    receiving, by a first device, a message indicating the beginning of an authentication process to admit a second device to a secure network;
    determining a timer duration based, at least in part, on a role level assigned to the first device and by operation of one or more computer processors;
    initiating a timer using the timer duration; and
    assuming, by the first device, a role for the authentication process to admit the second device to the secure network, based on the timer duration and a logoff message from the second device, comprising:
        upon determining that the timer expires prior to receiving the logoff message from the second device, assuming a role of authenticator for the authentication process to admit the second device to the secure network; and
        upon determining that the logoff message is received from the second device prior to the timer expiring, assuming a role of supplicant for the authentication process to admit the second device to the secure network.

2. The method of claim 1, wherein determining the timer duration comprises:
    generating a random timer duration; and
    adding the random timer duration to a base timer duration specific to the assigned role level, thereby decreasing a likelihood that the timer duration is identical to that of any other device having the same role level.

3. The method of claim 1, wherein the role level is assigned by an operator.

4. The method of claim 1, wherein the role level is assigned automatically using a role assignment algorithm that considers at least one of:
    available processing resources, connectivity to an authentication server, and a role history.

5. The method of claim 1, wherein assuming a role for the authentication process further comprises:
    upon determining that a logoff message is received from the second device after assuming the role of authenticator, sending a message to the second device indicating another beginning of the authentication process.

6. The method of claim 1, wherein assuming a role for the authentication process further comprises:
    sending a logoff message to the second device after assuming the role of authenticator.

7. The method of claim 1, wherein the role level determines a device to be an authenticator and may be configured by an operator.

8. An apparatus, comprising:
    supplicant logic for performing operations of a supplicant role during an authentication process for admitting a device to a secure network;
    authenticator logic for performing operations of an authenticator role during the authentication process for admitting the device to the secure network; and
    selection logic configured to:
        in response to receiving a message indicating the beginning of the authentication process and by operation of one or more computer processors, determine a timer duration based, at least in part, on a role level assigned to the apparatus;
        initiate a timer using the timer duration; and
        assume a role for the authentication process to admit the device to the secure network, based on the timer duration and a logoff message from the device, comprising:
            upon determining that the timer expires prior to receiving the logoff message from the device, assume the authenticator role for the authentication process for admitting the device to the secure network; and
            upon determining that the logoff message is received from the device prior to the timer expiring, assume the supplicant role for the authentication process for admitting the device to the secure network.

9. The apparatus of claim 8, wherein the selection logic is configured to determine the timer duration by generating a random timer duration and adding the random timer duration to a base timer duration specific to the assigned role level, thereby decreasing a likelihood that the timer duration is identical to that of any device having the same role level.

10. The apparatus of claim 8, further comprising:
    a lookup table containing base timer durations associated with different role levels, wherein the selection logic is configured to retrieve a base timer duration for the assigned role level from the lookup table.

11. The apparatus of claim 8, further comprising an interface allowing an operator to assign the role level.

12. The apparatus of claim 11, wherein the interface allows the operator to specify timer durations for different role levels.

13. The apparatus of claim 8, further comprising assignment logic configured to automatically assign the role level using a role assignment algorithm.

14. The apparatus of claim 13, wherein the role assignment algorithm considers at least one of the following when assigning the role level:
    available processing resources, connectivity to an authentication server, and a role history.

15. The apparatus of claim 8, wherein the selection logic is configured to:
    upon determining that a logoff message is received from the device after assuming the role of authenticator, send a message to the device indicating another beginning of the authentication process.

16. The apparatus of claim 8, wherein the selection logic is configured to:
    sending a logoff message to the device after assuming the role of authenticator.

17. The apparatus of claim 8, wherein the role level determines a device to be an authenticator and may be configured by an operator.

18. An apparatus, comprising:
 means for performing operations of a supplicant role during an authentication process for admitting a device to a secure network;
 means for performing operations of an authenticator role during the authentication process for admitting the device to the secure network; and
 means for selecting between the supplicant role and the authenticator role during the authentication process by:
  determining a timer duration based, at least in part, on a role level assigned to the apparatus;
  initiating a timer using the timer duration; and
  assuming a role for the authentication process to admit the device to the secure network, based on the timer duration and a logoff message from the device, comprising:
   assuming the authenticator role for the authentication process for admitting the device to the secure network, upon determining that the timer expires prior to receiving a logoff message from the device; and
   assume the supplicant role for the authentication process for admitting the device to the secure network, upon determining that a logoff message is received from the device prior to the timer expiring.

19. The apparatus of claim 18, wherein the means for selecting is configured to determine the timer duration by generating a random timer duration and adding the random timer duration to a base timer duration specific to the assigned role level, thereby decreasing a likelihood that the timer duration is identical to that of any device having the same role level.

20. The apparatus of claim 18, further comprising:
 a lookup table containing base timer durations associated with different role levels, wherein the means for selecting is configured to retrieve a base timer duration for the assigned role level from the lookup table.

21. The apparatus of claim 18, further comprising means for automatically assigning the role level using a role assignment algorithm.

22. The apparatus of claim 21, wherein the role assignment algorithm considers at least one of the following when assigning the role level:
 available processing resources, connectivity to an authentication server, and a role history.

\* \* \* \* \*